US008332132B2

(12) United States Patent
Groenhuijzen et al.

(10) Patent No.: US 8,332,132 B2
(45) Date of Patent: Dec. 11, 2012

(54) NAVIGATION DEVICE ASSISTING ROAD TRAFFIC CONGESTION MANAGEMENT

(75) Inventors: Lucien Groenhuijzen, Almere (NL); Ben Rutten, Dalft (NL); Rob Schuurbiere, Rotterdam (NL)

(73) Assignee: Tomtom International B.V., Amsterdam (NL)

( * ) Notice: Subject to any disclaimer, the term of this patent is extended or adjusted under 35 U.S.C. 154(b) by 925 days.

(21) Appl. No.: 12/073,792

(22) Filed: Mar. 10, 2008

(65) Prior Publication Data

US 2008/0234921 A1 Sep. 25, 2008

Related U.S. Application Data

(60) Provisional application No. 60/905,894, filed on Mar. 9, 2007.

(51) Int. Cl.
*G06F 19/00* (2006.01)
*G01C 21/34* (2006.01)

(52) U.S. Cl. .................... 701/119; 701/210; 340/995.13

(58) Field of Classification Search .................. 701/209, 701/201, 213, 118, 119, 210, 117; 340/995.19, 340/995.21, 995.13
See application file for complete search history.

(56) References Cited

U.S. PATENT DOCUMENTS

| | | | | |
|---|---|---|---|---|
| 6,222,836 | B1 | 4/2001 | Sekiyama | |
| 6,253,146 | B1 * | 6/2001 | Hanson et al. | 701/202 |
| 6,356,838 | B1 * | 3/2002 | Paul | 701/209 |
| 7,680,596 | B2 * | 3/2010 | Uyeki et al. | 701/210 |
| 7,818,121 | B2 * | 10/2010 | Uyeki et al. | 701/210 |
| 2002/0128766 | A1 | 9/2002 | Petzold | |
| 2003/0171870 | A1 * | 9/2003 | Gueziec | 701/202 |
| 2006/0145892 | A1 * | 7/2006 | Gueziec | 340/905 |
| 2006/0206256 | A1 | 9/2006 | Kumagai | |

FOREIGN PATENT DOCUMENTS

| | | |
|---|---|---|
| DE | 10131526 | 1/2003 |
| DE | 10324269 | 12/2004 |

OTHER PUBLICATIONS

International Search Report issued Jul. 11, 2008 for International Application No. PCT/EP2008/001880.

* cited by examiner

*Primary Examiner* — Ronnie Mancho

(57) ABSTRACT

A navigation device has a GPRS receiver for receiving real-time information about slow traffic flow or slow average speed on a stretch of motorway, indicating congestion. The device calculates a new itinerary to avoid the congestion, based on historically recorded speeds on secondary roads weighed by the current average speed in the congestion area.

10 Claims, 7 Drawing Sheets

(202) $$V_{i,VRS\text{-}seg} = F_{line} \cdot V_{i,hist\text{-}seg}$$

(204) $$F_{line} = F_{line}\left(V_{real\text{-}mot\text{-}line}, V_{hist\text{-}mot\text{-}line}\right)$$

(206) $$V_{real\text{-}mot\text{-}line} = \frac{1}{N} \sum V_{real\text{-}mot\text{-}sec\ j}$$

(208) $$V_{hist\text{-}mot\text{-}line} = \frac{1}{N} \sum V_{hist\text{-}mot\text{-}sec\ j}$$

(210) $$F_{line} = V_{real\text{-}mot\text{-}line} / V_{hist\text{-}mot\text{-}line}$$

(212) $$M_{line} = TF_{real\text{-}mot\text{-}line} / TF_{hist\text{-}mot\text{-}line}$$

*Fig. 2*

(302) $$V_{real\text{-}mot\text{-}threshold} = G_{threshold} \cdot V_{hist\text{-}mot}, \quad 0 < G_{threshold} < 1$$

(304) $$V_{i,VRS\text{-}seg} = H_{area} \cdot V_{i,hist\text{-}seg}$$

(306) $$H_{area} = H_{area}(V_{real\text{-}area}, V_{hist\text{-}area})$$

(308) $$V_{real\text{-}area} = \frac{1}{M} \sum V_{j,\,real}$$

(310) $$V_{hist\text{-}area} = \frac{1}{M} \sum V_{j,\,hist}$$

(312) $$H_{area} = V_{real\text{-}area} / V_{hist\text{-}area}$$

*Fig. 3*

NAVIGATION DEVICE ASSISTING ROAD TRAFFIC CONGESTION MANAGEMENT

PRIORITY STATEMENT

The present application hereby claims priority under 35 U.S.C. §119(e) on U.S. Provisional Patent Application No. 60/905,894 filed Mar. 9, 2007, the entire contents of which is hereby incorporated herein by reference.

FIELD OF THE INVENTION

The invention relates to a mobile electronic navigation device, software for implementing a functionality of the device, and, a method of providing a service to a user of such as device.

BACKGROUND ART

Advances in technology and the increasing pressures of congested road environments have encouraged the development and adoption of Personal Navigation Devices (PND). The abbreviation PND is sometimes used to refer to a "portable navigation device", but in this specification will be given its more expansive definition, covering any kind of personal navigation device that is either portable (e.g., can be fixed to an auto windscreen using a suction mount), or embedded (e.g. permanently fixed into an automobile). PNDs can be dedicated navigation devices (e.g., a device whose primary function is navigation) or can have multiple other applications (e.g., media players) or can have a primary function other than navigation (e.g., a mobile telephone). PNDs are used predominantly, but not exclusively, in cars and other motor vehicles. PNDs incorporate geographical map databases including road information and points of interest. They generally include software which allows the user to input a destination and to be provided with one or more routes; driving instructions are issued to guide the driver along the selected route to the destination. The PND may include a mount attachable to an automotive windscreen.

The selection of the route along which to guide the driver can be very sophisticated, and the selected route may take into account existing and predicted traffic and road conditions, historical information about road speeds, and the driver's own preferences for the factors determining road choice. In addition, the device may continually monitor road and traffic conditions, and offer to or choose to change the route over which the remainder of the journey is to be made due to changed conditions.

Road travel is a major part of everyday life for businesses, for other organizations, and for private individuals. The costs of traffic delays can be very large. The purely financial cost has been estimated as billions of pounds in the UK alone. In view of these costs, systems which can assist drivers to optimize their travel, for instance by selecting the best route and by avoiding congestion delays, are of significant value. In fact, a diverse array of driver information systems has grown up. The longest established are broadcast radio traffic reports which aggregate data from a number of sources such as the police, eye-in-the-sky, and more recently mobile phone calls from drivers stuck in traffic jams, to provide subjective advice about incidents and delays. Radio Data System (RDS) radios make these systems more effective by automatically cutting to traffic reports from normal radio programs. Static route planning systems are provided on the websites of major motoring organizations such as the Automobile Association (AA) and RAC in the UK. These allow a driver to enter the points of a journey and to be given a route and driving instructions for that route.

In the recent past, in-vehicle personal navigation devices have been introduced based on Global Positioning System (GPS) technology. Examples of these are the TomTom GO™ series of PNDs. Personal navigation devices use the GPS system to discover the exact position of the vehicle on the road network and to plot the location of the vehicle on an on-screen road map. PNDs contain a mechanism for computing best or good routes between two or more points on the road network and can direct the driver along the chosen route, continually monitoring their position on that route. Personal navigation devices have begun to incorporate traffic information into their services, and in some, traffic information is integrated into the route selection process: the PND will route around congested roads. Where traffic information is provided by the PND, the user can observe delays where they impact the selected route, and guide the device to re-plan a route avoiding the delayed sections of road if they consider this necessary. Real-time traffic monitoring systems, based on various technologies (e.g. mobile phone calls, fixed cameras, GPS fleet tracking) are being used to identify traffic delays and to feed the information into notification systems.

As mentioned above, road traffic can be monitored in real-time on the basis of mobile phone calls as follows. In a mobile phone system, subscribers carry handsets. When the subscriber initiates or receives a call or text message or data session, radio communication takes place between the handset and a base transceiver station (BTS), the familiar mast on the modern landscape. As well as transmitting an encoding of the message passing between caller and call recipient, the handset and BTS transmit a large amount of control information between themselves for the purposes of reliably and efficiently supporting the communication; for example the system must choose when to pass the call to another BTS as the subscriber moves about. The control information in a Global System for Mobile Communications (GSM) system or in a Universal Mobile Telecommunications System (UMTS), contains information on the signal strength of neighboring BTSes, timing advance information to instruct handsets further from the BTS to transmit earlier in order to match their time slot, transmission error rates and much more. Other technologies, such as code division multiple access (CDMA), use different information to achieve the same purposes of reliable and efficient communication. Collectively, these parameters are being referred to as the mobile phone control parameters. A location parameter database (LPDB) correlates mobile phone control parameters with geographical locations of handsets. LPDBs can be constructed and maintained by one of several means, and can map one of several useful subsets of control parameters to geographical locations.

For more background information on such PNDs and above services, see, e.g., US patent application publications US 20070225902; US 20070185648; US 20070118281; and US 20070117572, all owned by TomTom International B.V. and herein incorporated by reference.

For more background information on monitoring road traffic through monitoring usage of mobile telecommunication devices onboard road vehicles see, e.g., WO200245046 ("Traffic monitoring system"); and WO2007017691 ("Method of finding a physical location of mobile telephone at a given time"), incorporated herein by reference.

SUMMARY OF THE INVENTION

The inventors aim at improving navigational guidance to an individual user of a road vehicle. The inventors further intend to improve traffic management so as to avoid or reduce traffic congestion.

The invention relates, among other things, to a mobile electronic navigation device configured for providing navigation information to a mobile user on a road network, depending on a geographic position of the device and upon being programmed to guide the mobile user to a pre-determined destination via an itinerary. The device comprises: a storage for storing information, e.g., roadmap information, about a segment of the road network, including historical data representative of respective historical traffic progress (e.g., average speeds or average traffic flow) on respective roads in the segment; a wireless receiver for receiving data indicative of a current traffic progress (e.g., current average speed or current traffic flow) on a stretch of a specific road in the segment; and a data processor coupled to the receiver. The processor is further operative to carry out following tasks. The processor determines if the stretch is included in a portion of the itinerary yet to be traveled. If the processor has determined that the stretch is not included, the itinerary is being used for determining the navigational guidance. If the processor has determined that the stretch is included, the processor uses the historical data to determine an alternative itinerary to the destination based on comparing a first expected travel time for the itinerary, given the current traffic progress, to a second expected travel time for the alternative itinerary. Depending on a result of the comparing, the processor starts to provide the navigation information with respect to the alternative itinerary.

Accordingly, the navigation device in the invention provides navigational guidance according to an alternative itinerary upon receipt of real-time information about the current traffic progress on a stretch of road in the upcoming leg of the original itinerary that may indicate that the alternative itinerary has a shorter expected travel time. The data received via the receiver may indicate an emerging or existing traffic jam in the upcoming leg of the trip. The device in the invention then seeks an alternative to the original itinerary for the part to be traveled. If the traffic jam has disappeared before the user has to be guided according to the alternative itinerary, the receiver receives data indicating an improved traffic progress (e.g., increased traffic flow or increased average speed) on the stretch and the device determines in a similar way that the original itinerary is to be taken as a basis for guidance.

In an embodiment of the device in the invention, the second expected travel time is calculated based on scaling the historical traffic progress (e.g., average speed or average traffic flow) on a further road in the alternative itinerary with a quantity representative of the current traffic progress (current average speed or current traffic flow) on the specific road. The scaling finds its origin that congestion on one road may lead to heavier traffic on connecting roads. That is, the congestion affects traffic flow and average speeds in the vicinity. By means of taking into consideration this phenomenon through the scaling, alternative routes are calculated that more reliably approximate the shortest overall travel time to the destination.

In addition to the current traffic progress conditions, current or expected weather conditions may also affect the travel time or, more generally, may also affect the itinerary. Real-time information about weather conditions is therefore preferably also taken into account when calculating modifications to the current itinerary. For the purpose of the invention, weather conditions such as fog, rain, snowfall, black ice, etc., can be translated into quantities representative of the (virtual) traffic progress. In case of hazardous road conditions due to bad weather, the expected travel time to cover the itinerary's stretch affected by the weather is scaled up. The scaling factor can be determined, e.g., based on historical data (see the historical data extracted from GPS traces further below) or can be determined by experiment or roughly estimated. This scaling up of the travel time is the quantity considered in the data processing in the invention regardless of the origin: whether originating from traffic congestion or from hazardous road conditions. Accordingly, the concept "current traffic progress" is also understood herein as to cover "current or expected weather conditions" for the purpose of the invention.

Another embodiment of the invention relates to software for a mobile navigation device configured for providing navigation information to a mobile user on a road network, depending on a geographic position of the device and upon being programmed to guide the mobile user to a pre-determined destination via an itinerary. The device comprises: a storage for storing information about a segment of the road network, including historical data representative of respective historical traffic progress on respective roads in the segment; a wireless receiver for receiving data indicative of a current traffic progress on a stretch of a specific road in the segment; and a data processor coupled to the receiver. The software comprises instructions for control of the processor to: determine if the stretch is included in a portion of the itinerary to be traveled; if the stretch is not included, to keep using the itinerary; if the stretch is included, using the historical data to determine an alternative itinerary to the destination based on comparing a first expected travel time for the itinerary, given the current traffic progress, to a second expected travel time for the alternative itinerary; depending on a result of the comparing, starting to provide the navigation information with respect to the alternative itinerary. Preferably, the software comprises further instructions for the processor to calculate the second expected travel time based on scaling the historical traffic progress on a further road in the alternative itinerary with a quantity representative of the current traffic progress on the specific road.

Accordingly, the software can be provided as an aftermarket add-on or as an upgrade to an installed base of electronic navigation devices that have a wireless receiver. A separate wireless receiver can optionally be mounted to a conventional electronic navigation device so as to make use of the service enabled by the supply data representative of real-time traffic conditions as specified above.

The wireless receiver introduces above includes, e.g., a General Packet Radio Service (GPRS) receiver. As known, GPRS is a packet-oriented Mobile Data Service available to users of GSM mobile telephones. The expression "packet oriented" refers to the way data packets are multiplexed. GPRS data communication can be unidirectional or bidirectional. Alternatively, the wireless receiver comprises a Radio Data System (RDS) receiver. The RDS technology uses conventional FM radio broadcasts to send data. RDS technology is typically used to implement a Traffic Message Channel (TMC) for delivering traffic information to drivers. Other implementations of the wireless receiver are based on, e.g., Digital Audio Broadcasting (DAB) technology, or satellite radio, the latter using a communications satellite that covers a larger geographical area than do transmissions using a terrestrial technology.

The GPRS technology enables a bidirectional data communication. This can be used in an embodiment of the invention, wherein the PND has a GPRS receiver and a GPRS transmitter and wherein the PND is configured as a thin-client that delegates to a server the calculation and/or re-calculation of the itinerary to the predetermined destination.

Accordingly, the inventors further propose a method of providing navigation information to a user of a mobile navigation device, depending on a geographic position of the device, for guiding the user to a pre-determined destination via an itinerary. The method comprises following steps. Data is received from the device representative of the geographical position. A segment of a road network is determined relevant to the itinerary given the device's current geographical position. Information is determined about the segment, including historical data representative of respective historical traffic progress on respective roads in the segment. Current traffic progress is determined of traffic on a stretch of a specific road in the segment. Then it is determined whether or not the stretch is included in a portion of the itinerary to be traveled. If the stretch is not included, then the itinerary is used. If the stretch is included, the historical data is used to determine an alternative itinerary to the destination based on comparing a first expected travel time for the itinerary, given the current traffic progress, to a second expected travel time for the alternative itinerary. Depending on a result of the comparing, navigation information is provided with respect to the alternative itinerary.

Preferably, the second expected travel time is calculated based on scaling the historical traffic progress on a further road in the alternative itinerary with a quantity representative of the current traffic progress on the specific road.

An advantage of the thin-client approach or of having the processing delegated to a server, resides in the fact that the server has available traffic information and weather information about multiple geographic areas, including the area wherein the user is advancing. This enables dynamically optimizing the itinerary on a scale larger than only locally within a single one of the geographic areas.

BRIEF DESCRIPTION OF THE DRAWING

The invention is explained in further detail, by way of example and with reference to the accompanying drawing, wherein:

FIGS. 2 and 3 give formulae explaining aspects of the invention;

Throughout the Figures, similar or corresponding features are indicated by same reference numerals.

DETAILED EMBODIMENTS

Figure 1:
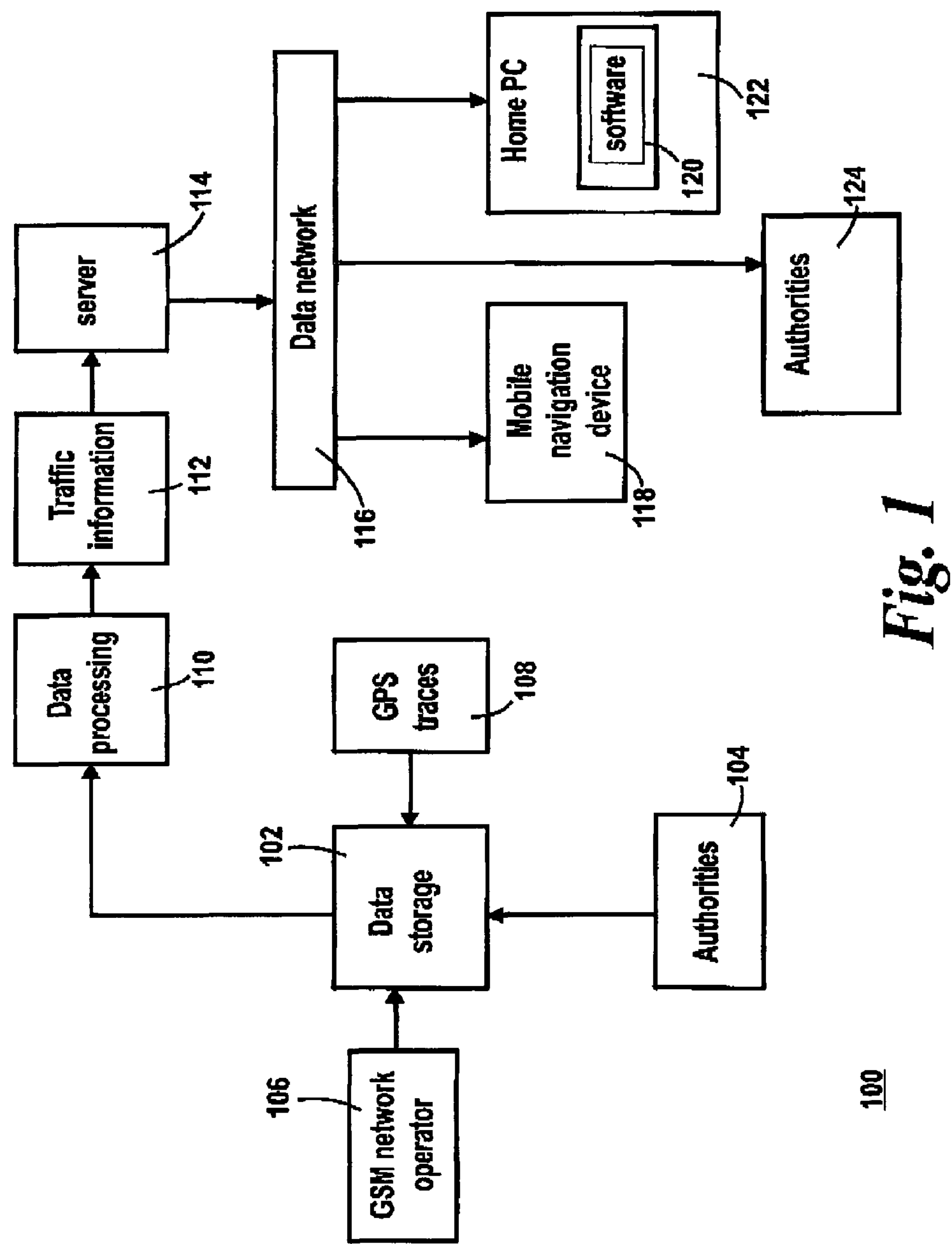
FIG. 1 is a block diagram of a system in the invention.

According to some studies, about 25% of traffic monitored on a specific road or highway consists of vehicles driving a longer, inter-regional route. This is a significant group which could take quite easily an alternative to the specific road or highway. The question is how to inform of the alternative? Authorities could inform all drivers driving in the region north of the city of Amsterdam that today it is better to use the Enkhuizen—Lelystad dike road if they intend to go to Flevoland or beyond. Drivers coming from the Amstelveen/Schiphol region could be advised to drive via the city of Utrecht. However, it is extremely difficult to inform these drivers and even more so to convince them that they should take the advice. The drivers need more detailed information in order to be able to accept the alternative route.

The system in the invention proposes the alternative routes to a driver via the mobile navigation device onboard the driver's vehicle. The alternative routes are proposed together with a clarification of the expected advantage of taking these alternative routes. Accordingly, when traffic gets congested in a certain geographical region, the system of the invention advises the drivers, driving within this region or traveling towards this region, to proceed according to the directions being currently given via the mobile navigational device in order to avoid the congestion automatically. The system in the invention thus helps the drivers to reach their destination sooner. In addition, the system also contributes to reducing the volume of traffic passing through the congested area by means of spreading it across the rest of the road network in the vicinity of the congested region.

The majority of the cars in traffic jams turn out to be on a short intra-regional trip. An example of drivers on an intra-regional trip is people living in the town of Almere who intend to do some shopping in the nearby city of Amsterdam. The system of the invention enables these drivers to be informed, before starting their trip, about expected travel times. If delays are to be expected due to traffic congestion, these people may want to reconsider their trip. They may decide to do some local shopping instead, to drive to another town or city, or to take one of the proposed alternative routes or use public transport. Again, traffic volume passing through the congested area will be reduced.

There always remains a group of drivers who, despite the congestion, decide to enter the congested area. It is a common misunderstanding that in this situation, driving through small villages and city centers instead, so as to bypass the congestion, is an acceptable solution. Studies have confirmed that such driving is completely ineffective. Reasons for this are, among others, that the maximum allowed road speeds are low and that, because of traffic lights and non-efficient routes, the average speed attainable is not higher than 15 km/hr to 25 km/hr. In most cases the driver's destination is reached much faster by just staying the traffic jam or using the regional roads. All devices from TomTom, the current Assignee, use by default these settings of the fastest route so as to avoid guidance via inefficient routes. However, the lack of reliable, up-to-date travel time information causes people to find there own routes, however inefficient. The system of the invention aims at convincing these people to accept the navigational information to their own benefit.

Accordingly, the system in the invention provides more reliable and efficient guidance directions to people on the move. Based on excellent travel time estimation people can consider and easier accept alternative routes. The system of the invention improves the utilization of the main road network and contributes to reducing traffic congestion. Drivers on inter-regional trips are re-routed so as to bypass the congested area. Regional drivers will be advised to use regional alternatives or just accept the delay caused by the congestion.

The system of the invention generates high-quality traffic information for the entire road network. The system enables to propose alternative routes that better exploit the road network available around congested areas. The system uses a multi-source strategy. The system combines traffic information from existing sources, e.g., as supplied by the road authorities and other public services, with traffic information generated based on data supplied by mobile telephone network operators and traffic information supplied by users of GPS-enabled mobile navigation devices. As a consequence, a detailed overview of congestion bottlenecks is created. This detailed overview can then be used to generate navigation information about alternative routes.

FIG. 1 is a block diagram of a system 100 in the invention. System 100 comprises a data collection and acquisition sub-system 102 that receives data from transportation departments, road operators or road authorities, local government, etc., all referred to here as "authorities" 104, data from mobile telephone network operator(s) 106 and data from users of GPS-enabled mobile navigation devices 108.

The data received from authorities 104 is representative of, e.g., conventional traffic information obtained via traffic monitoring equipment on the roadside. Such equipment includes, e.g., live cameras and other road sensors such as inductive loops integrated in the road surface. Other data received from authorities 104 may include roadwork reports. Yet other data received from authorities 104 include, e.g., weather forecasts or real-time weather radar data. The real-time weather radar data enables to, e.g., scale up expected travel times on roads in regions with heavy precipitation, with reduced visibility as a result of fog or drizzle, or with strong gusts of winds in order to account for slower traffic.

The data received from operator 106 is representative of road traffic monitored in real-time on the basis of mobile phone calls as explained above and in, e.g., WO200245046 and WO2007017691, mentioned above.

The data received from users of GPS-enabled mobile devices 108 is based on the following. Device 108 is configured for recording GPS traces. When device 108 is in operational use, device 108 repeatedly records its geographic location and a time stamp in a file. The records in file enable to reconstruct the trips taken with this particular device. An example of such device 108 is made by the Assignee. Device 108 cooperates with a software program ("TomTom Home") installed on the user's home PC or laptop PC. The software program enables the user to update, personalize and otherwise manage device 108. For example, if the user wants to install a new map, a custom points-of-interest database, or have device 108 give directions in another voice, the user can simply download these and other components from a server via the Internet and have them installed on device 108. The program also allows planning one's trip in advance from home. When connected to the server, the server will upload the file of records. The records are collected from all devices 108 and stored in sub-system 102.

Accordingly, system 100 has real-time data available through mobile telephone network operator 106 and historic data available through the download of GPS traces. These data now are processed in data processing sub-system 110 for generating traffic information stored in storage 114.

Data processing sub-system 110 processes the historic data (e.g., as represented by the GPS traces from devices 108) is processed to generate traffic information, including mean speeds for roads that are not, or not adequately, covered by real-time data from operator 106 for the purposes of the invention. In order to explain the processing, consider the following scenario.

Consider the situation at an arterial route bypassing an urban environment. This urban environment can be a small town, bypassed by a national motorway or a heavily used big urban main road which goes around a major city, or crosses suburbs or the city's center. When the arterial route is not congested, the GSM-based data received from operator 106 and the GPS-based data from devices 108 indicate normal transit times on the main roads. But, during rush hour, the transit time might increase sharply. The data received from operator 106 and devices 108 indicate this increase in transit time during rush hour. An increase in transit time is equivalent in a decrease of the average road speed. For example, normally the average speed lies between, say, 100 km/hr and 120 km/h, but during rush hour the average speed is around 30 km/h. During rush hour, the average speed on the urban network of secondary roads decreases as well, e.g., from around 35 km/h to around 15 km/h. The real-time data received from operators 106 does not enable to reliably measure real-time travel times on the urban smaller roads owing to the low volume of traffic; only on the urban arterials the measured travel-times are useable owing to, among other things, the higher traffic volume. Therefore, if the mobile navigation device of a user does not consider these varying average road speeds on the secondary roads, it may lead the user into the congestion or slow-moving traffic on the secondary roads, as these are not associated with the average speed of 15 km/hr during rush hour, but erroneously with the static average speed of 35 km/hr, which is still faster than the current average speed of 30 km/hr on the congested arterial route.

In order to improve navigational guidance to the drivers, the inventors therefore propose to use both the real-time GSM-based data and the historical GPS-based data in order to provide an estimate of the average speed or travel time on the secondary roads as is explained further below in detail.

Now consider the following scenario. System 100 determines via, e.g., the data from operator 106, that a certain stretch of a specific motorway is congested. That is, the average speed on this stretch is dramatically lower than during normal traffic flow. It is plausible to assume that the congestion also affects the average speeds on the secondary roads leading into, or exiting from, the congested stretch of the motorway. The traffic information generated and stored as data in storage 112 relates to the average speed on the congested stretch and/or expected travel time to cover this stretch under current circumstances. Via a server 114, this data is sent via a data network 116, which includes a GPRS infrastructure, to users of electronic navigational devices 118 in the relevant geographic area. GPRS is a known technology enabling to receive data packets via a mobile data service available to users of GSM mobile telephones. As mentioned above, wireless data communication technologies other than GPRS can be used to communicate data from server 114 to device 118. GPRS is mentioned here as a practical example. Note also that in addition to traffic information in terms of current average speeds on the roads considered, server 114 may also communicate to devices 118 data representative of weather conditions existing or being expected in the relevant geographical area. The data could refer to, e.g., strong gusts of wind, fog, black ice, etc. Devices 118 are preferably configured to process this data to generate information conveyed to he users of devices 118 via their display monitor and/or loudspeaker.

Navigational devices 118 are configured to process this data as follows, and as is explained in further detail below. The congestion may affect the travel times of one or more users of devices 118, given their destinations and given their original itinerary as first calculated by devices 118. Device 118 now recalculates the itinerary by taking into account the expected speeds or travel times on the secondary roads in the congested area, given the speed on the congested motorway stretch. To this end, device 118 has available the required information, e.g., from its local storage. Device 118 thus can make an educated guess about what routes to take in the detour in order to optimize, e.g., travel time, in the presence of traffic congestion ahead.

Details of the approach taken are as follows. The inventors introduce the concept of a virtual real-time speed (VRS). In an embodiment of the invention, the VRS is computed within the PND in situations wherein real-time data is not available for the relevant road. The VRS is computed based on the historic average speed information for that road. The VRS is computed for secondary road sections in a certain geographic area with traffic affected by congestion on the main motorway or main arterial route in that area. The VRS is determined by the speed of the real-time traffic on the main motorway. The VRS on a secondary road is assumed to depend on the real-time speed on the neighboring main motorway under some circumstances. The invention now exploits this dependence to improve accuracy of navigational guidance to the individual user of device 118.

Several approaches can be taken to determining a VRS: a line-based approach and an area-based approach, as explained in detail below. Preferably, the area-based VRS is used. However, in case the area-based VRS cannot be computed, the line-based approach is used.

For the line-based approach, one proceeds as follows. The real-time speed on a section of the relevant motorway, as determined from the GSM-based data, has a value $V_{real\text{-}mot}$. The historical average speed on this section, as determined from the GPS-traces, has a value $V_{hist\text{-}mot}$. Now consider a road segment in the road network surrounding the section of the motorway. For this segment, labeled "i", the VRS is assigned a value $V_{i,VRS\text{-}seg}$ by means of, e.g., scaling the historical average speed of the segment $V_{i,hist\text{-}seg}$ with a function $F_{line}$ according to expression (202) of FIG. 2. The historical average speed of the segment $V_{i,hist\text{-}seg}$ is determined on the basis of the GPS traces mentioned above. Scaling function $F_{line}$ depends on a first quantity $V_{real\text{-}mot\text{-}line}$ and on a second quantity $V_{hist\text{-}mot\text{-}line}$ according to expression (204) in FIG. 2. First quantity $V_{real\text{-}mot\text{-}line}$ is defined as the average of the real-time speeds, as measured from the GSM-based data, on N sections of the relevant motorway according to expression (206). The sections are identified on the basis of, e.g., traffic message channel (TMC) codes known in the art. Second quantity $V_{hist\text{-}mot\text{-}line}$ is defined as the average of the historical speeds, as recorded from the GPS traces, on the N sections of the relevant motorway according to expression (208). An example of a useable scaling factor F is given in expression (210) of FIG. 2, but other dependences are possible as well. Expression (210) implies for expression (202) that the ratio of $V_{i,VRS\text{-}seg}$ to $V_{real\text{-}mot\text{-}line}$ is assumed to be equal to the ratio of $V_{i,hist\text{-}seg}$ to $V_{hist\text{-}mot\text{-}line}$. This is interpreted, roughly, as that the ratio of the number of vehicles, assumed to be currently present on secondary road segment "i", to the number of vehicles, currently present on the N sections of the motorway, equals the ratio of the number of vehicles, present in the past on segment "i" according to the GPS traces in the considered time window, to the number of vehicles, present in the past on the N sections of the motorway in the same time window. That is, the traffic on the secondary roads is scaled to the traffic on the main motorway.

Above examples of scaling factors in expressions (202), (204) and (210) give rise to relatively simple models that are, nevertheless, useful in modeling traffic flow in practice for purposes of the invention. The scaling factor signifies the phenomenon that congestion on the motorway leads to slower speeds on the connecting secondary roads in the neighboring part of the road network. In general, the relationship between speed and traffic flow is a complicated one, and may take into account many other quantities, in addition to speed, for modeling traffic flow, such as, e.g., response time, acceleration and deceleration of individual vehicles, the time-derivative of speed and/or traffic volume, the location-derivative of speed and/or traffic volume, etc. Shock waves may form in the traffic flow resulting in the notorious traffic jam or pile-up collisions. See, e.g., G. B. Whitham, "Linear and Nonlinear Waves", chapter 3.1 "Traffic Flows", Wiley-Interscience 1999.

Instead of using expression (202), one could use, e.g., a set of values for the quantity $V_{i,VRS\text{-}seg}$, e.g., a set of two values wherein one pre-set value represents normal speed (when the corresponding main motorway is not congested), and the other pre-set value represents the flow in case the main motorway is congested. The latter value could be determined by scaling the normal speed by a factor representative of the real-time speed at the connected stretch of the congested motorway. Other dependencies can be considered so as to determine a quantity representative of an expected travel time along a certain route, given the historical data about the route's average speed and/or traffic volume, while taking into account the effect of congestion on roads nearby.

The scaling factor of expression (210) uses the ratio of speeds. Alternatively, a scaling factor $M_{line}$ could be used with expression (202) that includes the ratio of a first quantity $TF_{real\text{-}mot\text{-}line}$ to a second quantity $TF_{hist\text{-}mot\text{-}line}$ as given in expression (212). First quantity $TF_{real\text{-}mot\text{-}line}$ is defined as the average of the real-time traffic flow (i.e., the number of vehicles passing a location per unit of time), as measured through, e.g., loop sensors in the road surface, on one or more sections of the relevant motorway. Second quantity $TF_{hist\text{-}mot\text{-}line}$ is defined as the average of the historical traffic flows on the one or more sections of the relevant motorway.

Note that the historical data taken into account in these calculations should preferably have time stamps in time slots corresponding to the current moment. For example, the VRS calculated at a moment being 17:00 GMT on a certain Wednesday should take into account data from GPS traces generated around the same time of the day and also on past Wednesdays. The line-based approach has turned out to be less accurate than the area-based approach. The line-based approach is therefore preferably used only when the area-based approach does produce an appropriate VRS. The area-based approach is discussed below in detail, followed by describing a scenario wherein the line-based approach should preferably be used.

For the area-based approach one proceeds as follows. The real-time speed on a section of the motorway is referred to as $V_{real\text{-}mot}$ and is determined on the basis of the GSM data. The historic average speed on this section is referred to as $V_{hist\text{-}mot}$ as determined on the basis of the GPS traces In case the real-time speed $V_{real\text{-}mot}$ on the motorway drops below a certain threshold level $V_{real\text{-}mot\text{-}threshold}$ (as an indication of a serious unusual blockage of the motorway), the area-based virtual real-time speed is computed.

Threshold speed $V_{real\text{-}mot\text{-}threshold}$ can be derived from the historic speed data using a threshold factor $G_{threshold}$. The historic speed data has been stored in the speed profile of that particular motorway section in storage 102 and the threshold factor $G_{threshold}$ has to be determined experimentally. Above considerations regarding time stamps in the line-based approach apply as well in the area-based approach. Expression (302) of FIG. 3 conveys the meaning of $G_{threshold}$. If $V_{real\text{-}mot}$ drops below the threshold speed $G_{threshold}$, then the VRS on the secondary roads in the area around the motorway section need to be used.

This VRS calculation is similar to the one discussed above under the line-based approach. The scaling factor $H_{area}$, however, is now computed for an area instead of for a line, assuming that enough real-time data is available for the roads in the area. The scaling factor $H_{area}$ per section of the motorway is computed by dividing, the averaged real-time speed of the roads in the relevant area by the averaged historic speeds of these roads where real-time speed is measured. Real-time speed measurements as extracted from the GSM-based data supplied by operator 106 discriminates in traffic on a road going in one direction and traffic on the same road going into the other direction. See, e.g., WO200245046 and WO2007017691, mentioned above.

Preferably, upon receipt of this real-time data by navigation device 118, device 118 only considers those measurements that relate to traffic flow in those directions and on those roads that lay in a routing corridor from the user's current location towards the pre-determined destination. Here, a routing corridor is that part of the road network around the congested area to be avoided, that comprises routes which are candidates for being included into the alternative itinerary. A route in this sense is a directed graph. By taking into account the routing corridor, one prevents, among others things, that traffic flowing into the direction opposite to the direction of travel of the user of device 118 and on the same route, is taken into account when determining the detour. Accordingly, scaling factor $H_{area}$ depends in general on the predetermined destination.

Another difference is that it will be scaled to the set of real-time measured speeds on the secondary road network instead of to the set of real-time measured speeds on the motorway stretch. The above is further explained as follows.

Expression (304) corresponds to expression (202) of FIG. 2, differing in the scaling factor. Scaling factor $H_{area}$ is specified in expression (306) of FIG. 3 as depending on a first quantity $V_{real\text{-}area}$ and a second quantity $V_{hist\text{-}area}$. First quantity $V_{real\text{-}area}$ is defined in expression (308) as being the average of all real-time speeds measured on the secondary roads, j=1, . . . , M in the road network segment around the congestion on the main road or motorway stretch. Second quantity $V_{hist\text{-}area}$ is defined in expression (310) as being the average of all historical speeds measured on the secondary roads, j=1, . . . , M in the road network segment around the congestion on the main road or motorway stretch. Preferably, only those real-time speeds and historical speeds are considered that belong to the routing corridor, as mentioned above. A simple example of scaling factor $H_{area}$ is given in expression (312) as the ratio of quantity $V_{real\text{-}area}$ to quantity $V_{hist\text{-}area}$. As mentioned above under the line-based approach, other dependencies may be considered in the area-based approach as well. Likewise, instead of basing the scaling factor $H_{area}$ on measured speeds (real-time and historical) one could instead take real-time traffic flow and historical traffic flow to determine scaling factor $H_{area}$.

The above calculation and recalculation of the itinerary has been illustrated with a scenario with a user of device 118 being on the road and receiving via GPRS updates about the traffic conditions ahead. A similar scenario is applicable to a user who is still at home and is planning his trip just before departing. The user now uses dedicated software 120 on his/her PC 124 in FIG. 1 for downloading the itinerary onto his/her mobile navigation device 118. Similarly, the current and expected traffic conditions give rise to a certain itinerary, that is downloaded to device 118 and that again may be changed dynamically while the user is driving. Further, the relevant data as provided by server 114 may be supplied to authorities 124 so as to be able to respond to the traffic situation. Authorities 124 may include those introduces under authorities 104, but may also include personnel of ambulances, fire engines, exceptional road transport operators, railway operators, bus operators, etc.

As mentioned above, the information gathered in storage 102 may also include information about current or expected weather conditions, e.g., as inferred from the weather radar. Note that hazardous weather may affect the road conditions similarly to traffic congestion from the point of view of traffic flow. That is, the average speed attainable in fog, heavy rain, during a snow storm, or in the presence of black ice will be lower than under more favorable weather conditions. In an embodiment of the invention, hazardous weather conditions can be mapped onto a quantity that represents an equivalent traffic flow for purposes of calculating the itinerary as described above. That is, the GPRS data are interpreted by device 118 as representative of traffic flow conditions or average speeds, whereas the data has originated directly from weather conditions.

Figure 4:
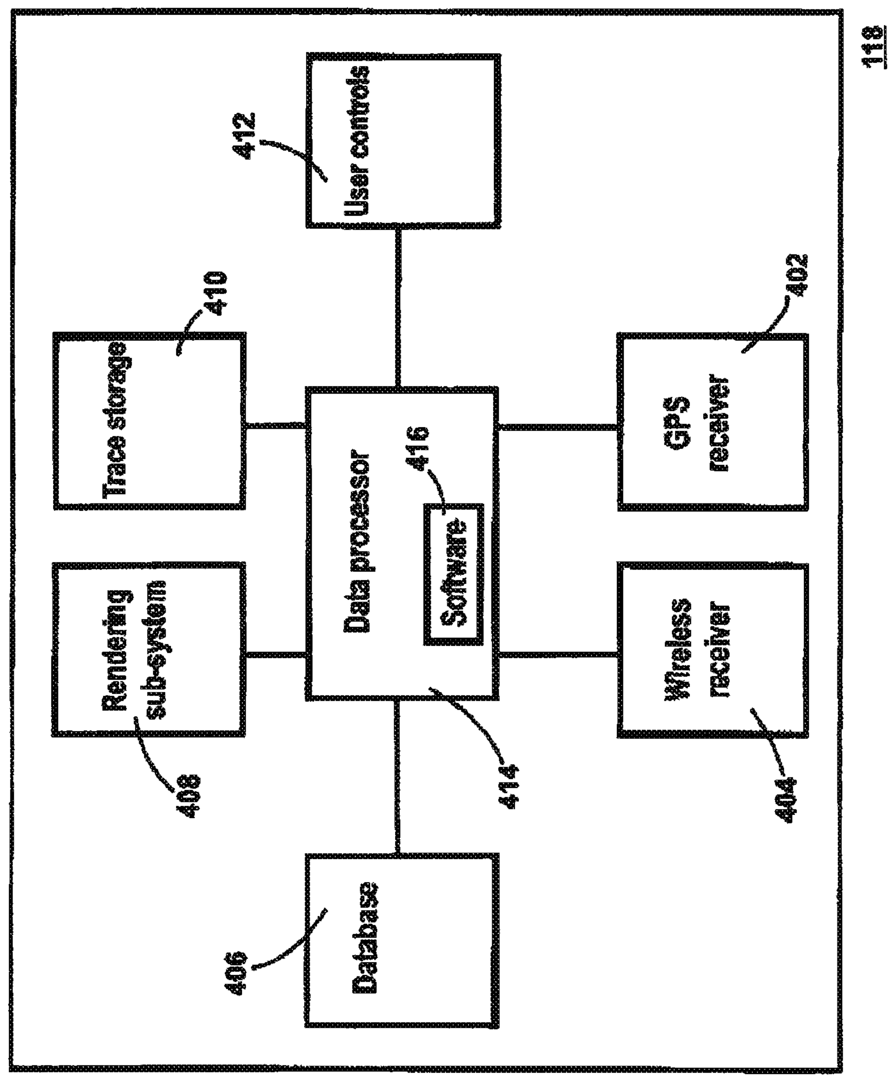
FIG. 4 is a block diagram of a first example of a navigation device in the invention.

In order to explain the use of the traffic information generated in system 100, consider mobile navigation device 118 in more detail. Reference is now made to FIG. 4

Navigation device 118 comprises: a GPS receiver 402, a wireless receiver 404, a database 406 storing map information, user controls 412 to enable a user to control device 120, a rendering sub-system 408, trace storage 410 and a data processor 414 executing under control of software 416. Processor 414 takes care of processing of data and of controlling the other components of device 118 for the purpose of delivering navigational service to the user of device 118. Wireless receiver 404 includes, e.g., a GPRS modem.

GPS receiver 402 is configured to determine the current geographic location of device 118. The information about the current location is used by processor 414 to determine in database 406 the road map and other location-dependent information relevant to the user of device 118 given the current location. Given the destination of the journey and the road information from the map, software 414 enables to generate navigational guidance and have it played out via rendering sub-system 408. As in conventional mobile navigation devices, the user enters the destination and other control information (e.g., preference with regard to playing out the guidance information via user controls 412, preference to avoid motorways, etc.). User controls include, e.g., hard buttons and/or soft keys implemented on a touch screen in conjunction with an ergonomic menu of control options, voice input and/or any other suitable means for letting the user interact with device 118.

Sub-system 408 preferably includes a display monitor (not shown) and a loudspeaker (not shown). The display monitor provides the guidance as graphical and text information, and the loudspeaker supplies the guidance in the form of pre-recorded or synthesized speech. As is clear, rendering sub-system 408 can be implemented as being partly or completely external to device 118. In that case, device 118 comprises suitable interfaces for communicating to sub-system 408. For example, rendering sub-system 408 comprises a projection system for a head-up display to project the relevant information onto the windscreen of the car (or on the visor of the helmet worn by a motorcycle rider). The car's projection system is usually physically integrated with the dashboard. The projection system for the motorcycle rider is integrated in the helmet, and is powered through a battery or a cord connecting the helmet to the motorcycle's power supply. The relevant data is then communicated wirelessly, e.g., via a Bluetooth interface, or wired. As another example, rendering sub-system 408 comprises a loudspeaker that is a component of the car's built-in sound system or, in the case of the motorcycle rider, is built into the rider's helmet.

During the trip, the geographic positions, based on the GPS information are stored in trace storage 410, together with time stamps. When device 118 is connected to the user's home PC, e.g., in order to receive updates to roadmaps or an update to software 416 from the service provider via the Internet, the data stored in storage 410 is sent to the service provider where it is processed anonymously, i.e., without being associated with the individual user of device 118.

GPRS is a known technology. GPRS modem 404 enables device 118 to receive data packets via a mobile data service available to users of GSM mobile telephones. The data rates are in the order of 56 kbps to 114 kbps. Generally, data services provided via GPRS can be point-to-point services (i.e., data communication between two users), and point-to-multipoint (or: multicast, i.e., from one user to many users). With regard to the multicast GPRS service, data packets can be broadcast within a certain geographical area. An identifier in the broadcast indicates whether the data packets are intended for all users in the geographical area or to a specific group of users. Within the context of the invention, this type of service enables to send updates with regard to traffic information relevant to users of device 118 within a certain geographical area.

In the above embodiments, the (re-)calculation of the itinerary is carried out by device 118 itself which, for this purpose, accommodates processor 414, database 406 and software 416. Device 118 only receives from server 114 the real-time traffic updates via GPRS modem 404 and then processes them to modify the itinerary and to generate navigational guidance on the basis of the modified itinerary and its current position according to the onboard GPS receiver.

Figure 5:
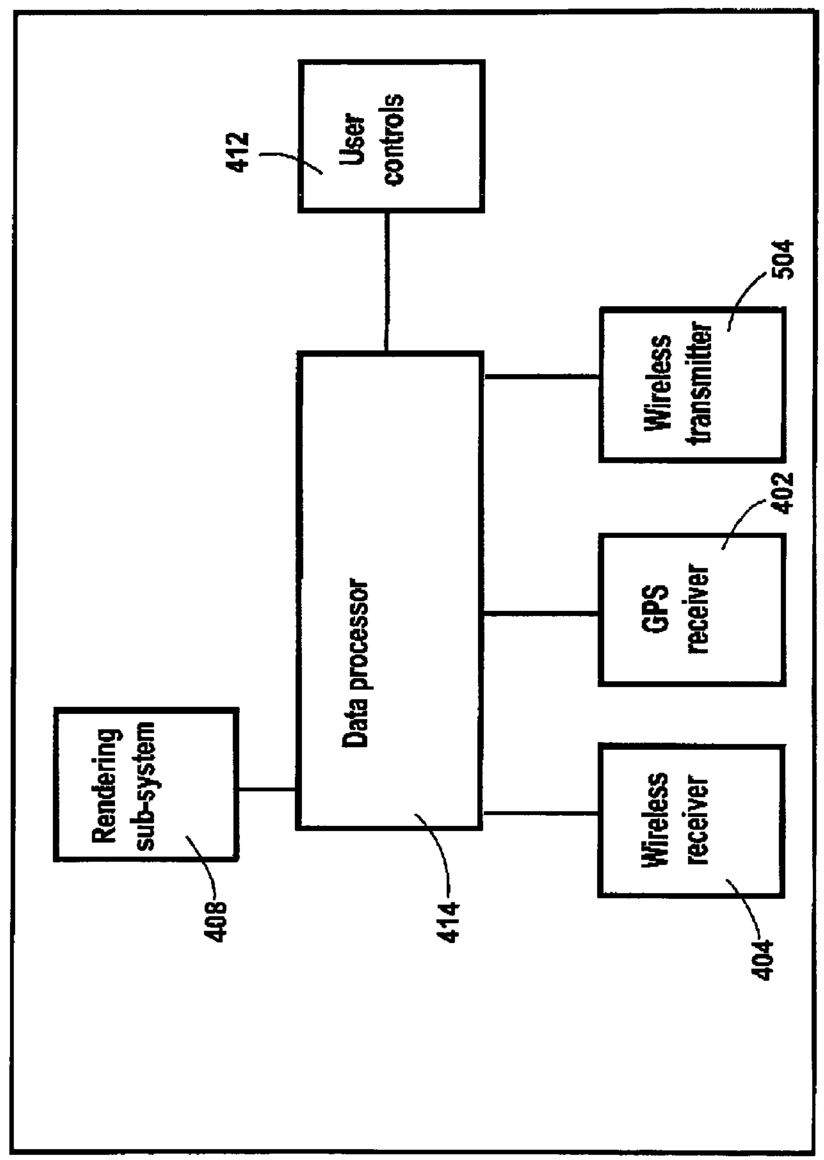
FIGS. 5 and 6 are block diagrams of further examples of a navigation device in the invention.

FIG. 5 is a diagram of a PND 502 in the invention, as an example of an alternative to device 118. Device 502 is implemented as a thin-client cooperating with server 114. Device 502 now comprises also a wireless transmitter 504 for communicating data to server 114. For example, transmitter 504 communicates to server 114 information about the destination of the journey to server 114 as entered through user controls 412, preferably together with the user's preferences (e.g., modality of supply of the navigational guidance such as male or female voice; avoid motorways; avoid toll booths; etc.). The preferences can be either selected by the user per individual journey or can have been pre-set as a default mode of operation. Transmitter 504 further communicates to server 114 data representative of the geographical position of device 502, as determined via GPS receiver 402.

Server 114 (re-)calculates the itinerary, similarly as discussed above, based on the current position of device 502, on the real-time traffic information gathered from GSM operator 106 and from GPS traces 108. If a large enough number of vehicles are using a PND configured as thin-client 502, then server 114 has real-time information about the geographical position of these vehicles that can be taken into account at system 100 as well to generate traffic information 112. Note that also for this reason, device 502 need not have trace storage 410 as the geographic positions of device 502 are being communicated in real-time to server 114.

An advantage of this implementation is that device 502 can be implemented as a lean data processing device. Another advantage is that server 114 can put navigational guidance to the user of device 502 into a broader context. This is explained as follows. Server 114 has traffic information and weather information 112 not only relating to the geographical area wherein the user of device 502 is currently present, but also relating to other geographical areas. This means that navigational guidance to the user of device 502 can be calculated so as to be optimized with regard to the entire region of the current journey from departure to destination. That is, a global optimization is possible. Note that, in contrast, device 118 receives only traffic information about local traffic conditions and that the modifications to the itinerary represent a local optimization. For example, consider the scenario wherein, in order to guide the user of device 118 around local, moderate traffic congestion in a specific area, device 118 provides guidance for a detour that happens to bring the user into a neighboring area wherein heavy congestion as a result of a massive pile-up has occurred as a result of a massive traffic accident. If the user had stayed with the original itinerary to ride out the moderate inconvenience he/she had not encountered the heavy congestion on the detour. Such bad luck, however, may be incidental and rare, depending on the density of the roads in the areas.

Depending on the bandwidth available at server 114 and in the wireless communication from server 114 to receiver 404, server 114 can be configured to carry out all data processing operations that were carried out in device 118 in the previous embodiment. That is, all data processing is delegated to server 114. Then, processor 414 in device 502 now mainly takes care of the control of rendering sub-system 408 to render the navigational guidance information. The navigational guidance information includes map data received from server 114 on an as-needed basis to be rendered on a display monitor of sub-system 408, and includes directions received from server 114 to be rendered as speech via loudspeaker in sub-system 408 and/or as graphical icons via the display monitor. In this case, device 502 itself does not need database storage 406 for storing road map data and other geographically related data, as everything is being communicated to device 502.

Note however, that, in order to receive data from server 114 for detailed navigational guidance, e.g., for rendering detailed roadmaps on the display monitor, receiver 404 and server 114 need to have sufficiently large bandwidth. GPRS-technology could in practice be inadequate for implementing the download of data from server 114 to device 502. GPRS technology can still be used for uploading of the GPS to server 114. Television technology, including a dedicated television channel can be used, in principle, for the download from server 114 to device 502.

Figure 6:
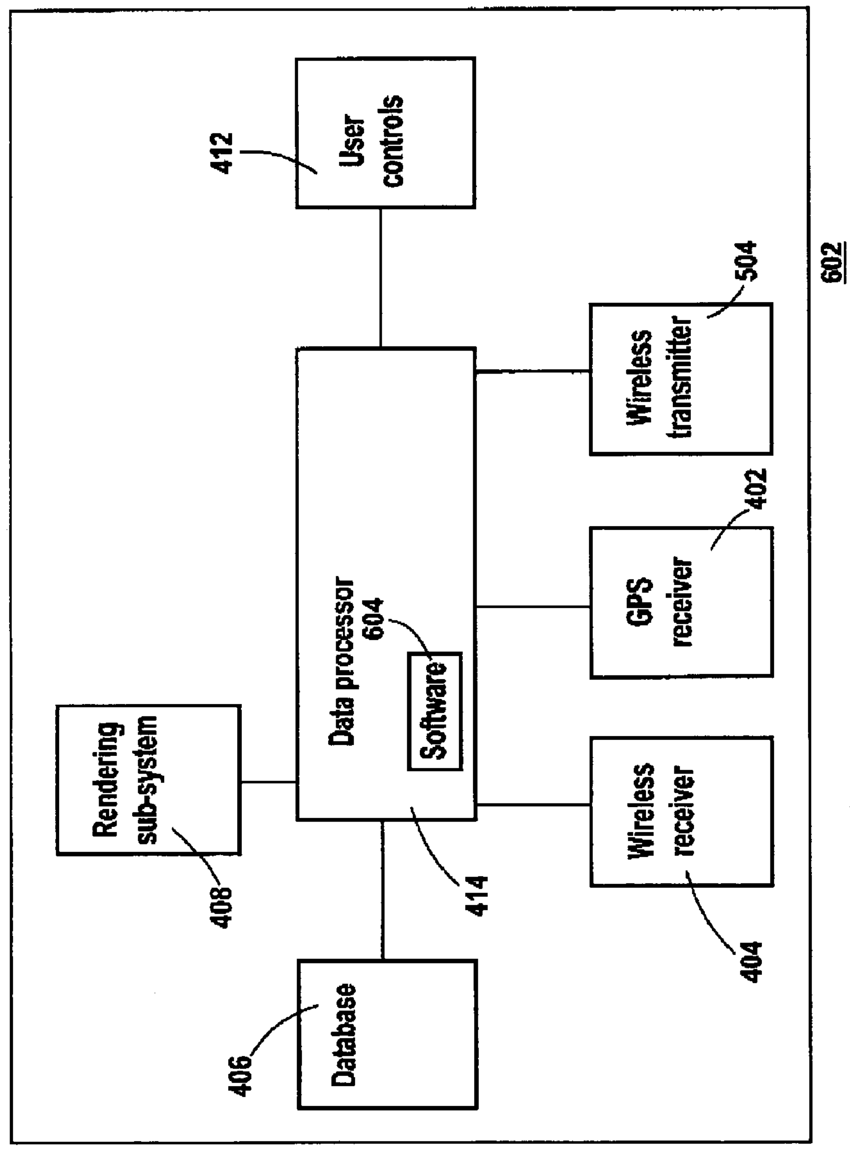

FIG. 6 is a block diagram of an embodiment 602 of a PND in the invention, whose configuration can be considered to lie halfway between the configuration of device 118 and the configuration of device 502. Similar to device 502, device 602 uses a wireless bidirectional data communication technology to communicate with sever 114, e.g., using GPRS technology in both receiver 404 and transmitter 504. Device 602 stores the road map data and other relevant geographic information in database 406, similar to device 118. Database 406, however, does not need to store the data representative of the historical averaged speeds recorded per individual road segment. Transmitter 504 uploads intermittently (for example, periodically or selectively depending on e.g., the changes in the direction of traveling) GPS data to server 114. As a result, server 114 is kept informed about the current geographical position of device 602. Server 114 downloads to device 602, via receiver 404, navigational guidance data. This data is calculated on the basis of the user's destination and the user's current geographic position, and on the basis of the historical and real-time traffic information and weather information created in storage 112. The creation process has been discussed above, e.g., with reference to FIGS. 2 and 3. As with embodiment 502, an advantage resides in the fact that server 112 has available traffic information and weather information about multiple geographic areas, including the area wherein the user is driving or riding. This enables an optimization of the itinerary on a scale larger than only locally within a single one of the geographic areas. Processor 414 processes the navigational guidance data received from server 114, under control of software 604, to generate guidance information suitable for the user of device 602. For example, processor 414 generates visual and/or auditory instructions on rendering sub-system 408, and combines the guidance information with the relevant road map data retrieved from database 406.

As to user interface aspects of a PND in the invention, such as devices 118, 502 or 602, the following features may contribute to perceived user-friendliness of the device in operational use.

A first feature relates to device 118, 502 or 602 configured or programmed to notify the user of the current update to the recent itinerary based on traffic conditions or weather conditions as discussed above. The user is notified through, e.g., synthesized voice via a loudspeaker of sub-system 408 and/or via graphical indications on a display monitor in sub-system 408.

A second feature relates to the graphical representation of the navigational guidance on the display monitor in sub-system 408 of device 118, 502 or 602. For example, a portion of the currently relevant roadmap is rendered on the display monitor, and the corresponding portion of the currently used itinerary is projected onto the displayed map portion. The user then forms a mental picture of that part of the itinerary and its geographic environment. At a given moment, the current itinerary is modified as a result of undesirable traffic conditions and/or weather condition in the upcoming leg of the current itinerary, as discussed above. The user then has to re-adjust his/her mental picture so as to correspond to the modified itinerary. Device 118, 502 or 602 now graphically indicates both the relevant portion of the previous itinerary and the relevant currently valid portion of the modified itinerary. For example, the previous portion is indicated in the color red and the currently valid portion is indicated in the color green. Alternatively, the previous portion and the currently valid portion are graphically indicated in, e.g., different dash styles. The previous portion is indicated as a string of dashes ("-----") and the currently valid portion is indicated as a string of plus signs ("+++++++"). The latter option is preferable if the user is color-blind. A configuration menu, accessible through user controls 412, enables the user to select a preferred way of indicating the previous and currently valid portions in operational use of device 118, 502 or 602.

A third option relates to providing information to the user of device 118, 502 or 602 as to the reason for the current modification to the itinerary. For example, the data received from server 114 includes an identifier processed by processor 414 to select one of multiple pre-defined icons or texts to be rendered in sub-system 408, the icons and texts being representative of the reason. For example, if the reason is heavy congestion due to a traffic accident, an icon is selected that shows a car lying on its side. As another example, an icon corresponding to a traffic sign conventionally used to indicate a slippery road can be used to indicate inclement weather conditions being the reason for the itinerary. As yet another example, icons can be selected to indicate rush hour traffic, a draw bridge, etc.

A fourth option relates to navigational guidance to drivers, e.g., daily commuters, who know they will encounter the usual unavoidable heavy traffic on their trip. These users of devices 118, 502 or 602 need not to be guided via a detour nor need they be informed about the usual congestion. The commuter can then, e.g., turn off device 118, 502 or 602, or ignore the guidance. A more user-friendly option is then to have the guidance operate in a mode, wherein only unusually severe congestion (i.e., out of the ordinary compared to the daily heavy congestion) gives rise to a modified itinerary. Server 114 has information about real-time average speeds or traffic volume and device 118 and/or server 114 have information about the historical average speeds or traffic volume. The operational mode can then be selected wherein device 118 or server 114 differentiates between usual congestion and unusual congestion so as to enable to selectively modify the itinerary.

Figure 7:
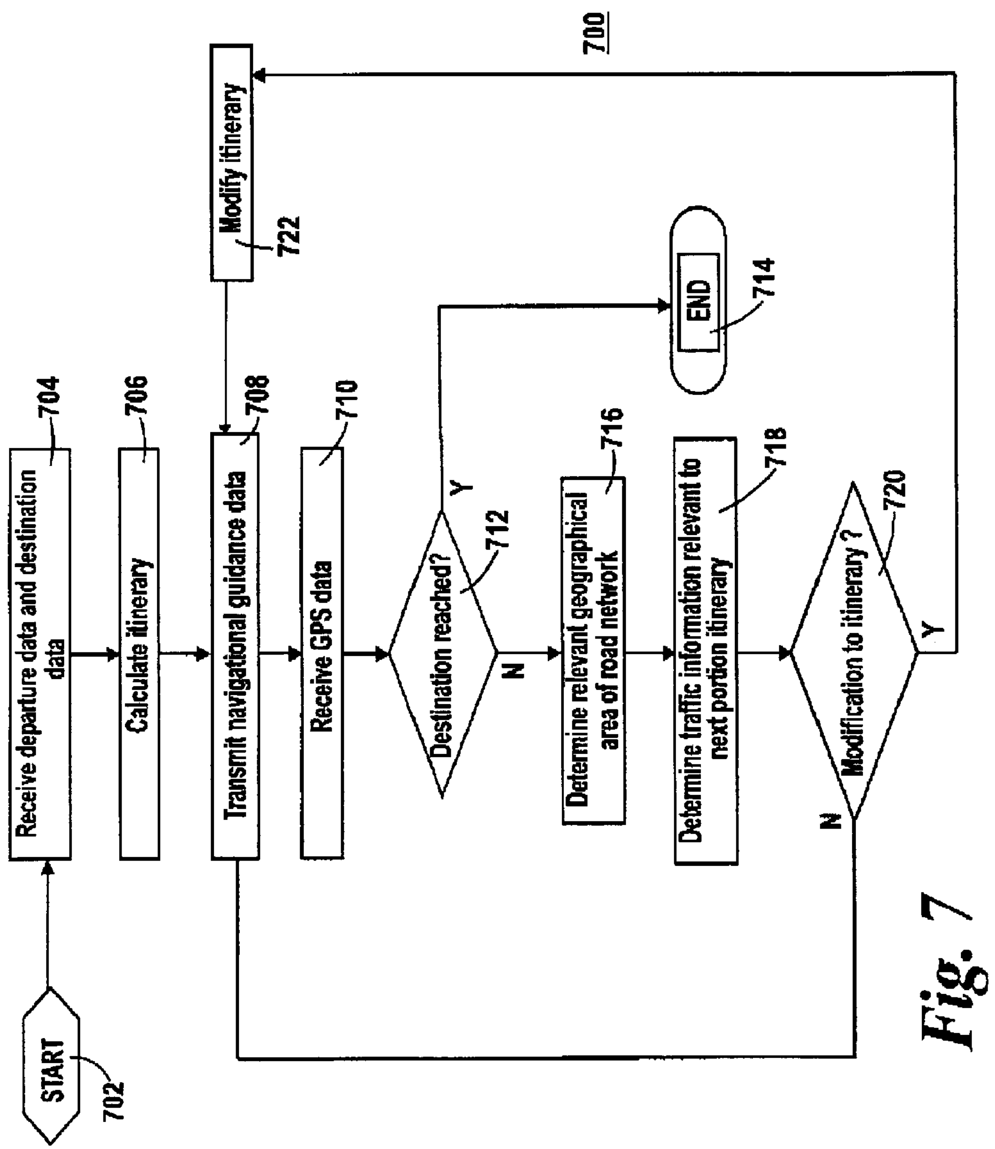
FIG. 7 is a flow diagram of a method of providing navigational guidance to users of the devices of FIGS. 5 and 6.

FIG. 7 is a flow diagram of an example of a method executed by server 114 of providing navigational guidance to devices 502 or 602 as discussed above. The method is initialized in a step 702. In a step 704, server 114 receives from device 502 or 602 information about its location of departure its destination. The location of departure can be determined by server 114 from the GPS data received from device 502 or device 602, or can be received as text data via GPRS as a result of the user entering or otherwise selecting the name of the destination through user controls 412. In a step 706, server 114 calculates an itinerary, optionally taking into account the user's preferences and traffic information and/or weather information available at storage 112. In a step 708, server 114 transmits, to device 502 or device 602, data representative of the navigational guidance. The data transmission is established via GPRS. Device 502 or 602 submits, e.g., via GPRS, data representative of the device's current geographic position, e.g., as determined via a GPS technology (or another technology). For convenience, this data is referred to as GPS data in this text. In a step 710, server 114 receives GPS data. In a step 712, server 114 determines if the destination has been reached. If the destination has been reached, the process of the method ends in a step 714. If the destination has not been reached, server 114 determines in a step 716 the geographic area corresponding to the position of device 502 or 602 according to the (PS data received. In a step 718, server 114 determines the traffic information and/or weather information relevant to the portion of the currently valid itinerary yet to be covered, i.e., the itinerary between the current geographic position and the destination. Based on this information, server 114 calculates in a step 720 candidate modifications to the currently valid itinerary to determine if travel time (or distance to be traveled or a weighted sum of these and other quantities) can be optimized. If server 114 determines that a modification to the currently valid itinerary is not needed, the process returns to step 708. If server 114 decides that a modification is needed, server 114 creates a modified itinerary in a step 722. The process returns to step 708 to supply navigational guidance data based on the modified itinerary.

The invention claimed is:

1. A mobile navigation device configured for providing navigation information to a mobile user on a road network, depending on a geographic position of the device and upon being programmed to guide the mobile user to a pre-determined destination via an itinerary, wherein the device comprises:

- a storage for storing information about a segment of the road network, including historical data representative of respective historical traffic progress on respective roads in the segment;
- a wireless receiver for receiving data indicative of current traffic progress on a stretch of a specific road in the segment;
- a data processor coupled to the receiver and operative to:
  - determine if the stretch is included in a portion of the itinerary to be traveled;
  - if the stretch is not included, to keep using the itinerary;
  - if the stretch is included, using the historical data to determine an alternative itinerary to the destination based on comparing a first expected travel time for the itinerary, given the current traffic progress, to a second expected travel time for the alternative itinerary; and depending on a result of the comparing, starting to provide the navigation information with respect to the alternative itinerary;

wherein the second expected travel time is calculated by the processor based on scaling the historical traffic progress on a further road in the alternative itinerary with a quantity representative of the current traffic progress on the specific road.

2. The device of claim 1, wherein the scaling quantity depends on data indicative of the current traffic progress on the specific road, and historical data representative of the historical traffic progress on the same road.

3. The device of claim 1, wherein data indicative of the current traffic progress is the average of real-time speeds on the specific road, and historical data representative of the historical traffic progress is the average of historical speeds on the same road.

4. The device of claim 3, wherein the scaling quantity is the ratio of the average of real-time speeds on the specific road to the average of historical speeds on the same road.

5. The device of claim 4, wherein the average of real-time speeds on the specific road is the average of real-time speeds on the sections of the road, and the average of historical speeds on the specific road is the average of historical speeds on the sections of the road.

6. The device of claim 2, wherein data indicative of the current progress is the average of real-time traffic flow on the specific road, and historical data representative of the historical traffic progress is the average of historical traffic flow on the same road.

7. The device of claim 3, wherein the scaling quantity is the ratio of the average of all real-time speeds on secondary roads around the specific road, to the average of all historical speeds on the secondary roads around the same road.

8. Software for a mobile navigation device configured for providing navigation information to a mobile user on a road network, depending on a geographic position of the device and upon being programmed to guide the mobile user to a pre-determined destination via an itinerary, wherein the device comprises:

a storage for storing information about a segment of the road network, including historical data representative of respective historical traffic progress on respective roads in the segment;

a wireless receiver for receiving data indicative of a current traffic progress on a stretch of a specific road in the segment; and a data processor coupled to the receiver; and wherein the software comprises instructions for control of the processor to:

determine if the stretch is included in a portion of the itinerary to be traveled;

if the stretch is not included, to keep using the itinerary;

if the stretch is included, using the historical data to determine an alternative itinerary to the destination based on comparing a first expected travel time for the itinerary, given the current traffic progress, to a second expected travel time for the alternative itinerary; and depending on a result of the comparing, starting to provide the navigation information with respect to the alternative itinerary;

wherein the software further comprises instructions for the processor to calculate the second expected travel time based on scaling the historical traffic progress on a further road in the alternative itinerary with a quantity representative of the current traffic progress on the specific road.

9. A method of providing navigation information to a user of a mobile navigation device, depending on a geographic position of the device, for guiding the user to a pre-determined destination via an itinerary, wherein the method comprises:

accessing a storage storing information about a segment of a road network, including historical data representative of respective historical traffic progress on respective roads in the segment;

receiving via a wireless receiver data indicative of a current traffic progress on a stretch of a specific road in the segment;

determining if the stretch is included in a portion of the itinerary to be traveled;

if the stretch is not included, using the itinerary;

if the stretch is included, using the historical data to determine an alternative itinerary to the destination based on comparing a first expected travel time for the itinerary, given the current traffic progress, to a second expected travel time for the alternative itinerary; and depending on a result of the comparing, starting to provide the navigation information with respect to the alternative itinerary;

wherein the second expected travel time is calculated based on scaling the historical traffic progress on a further road in the alternative itinerary with a quantity representative of the current traffic progress on the specific road.

10. A method of providing navigation information to a user of a mobile navigation device, depending on a geographic position of the device, for guiding the user to a pre-determined destination via an itinerary, wherein the method comprises:

receiving data from the device representative of the geographical position;

determining a segment of a road network relevant to the itinerary;

determining information about the segment, including historical data representative of respective historical traffic progress on respective roads in the segment;

determining current traffic progress on a stretch of a specific road in the segment;

determining if the stretch is included in a portion of the itinerary to be traveled;

if the stretch is not included, using the itinerary;

if the stretch is included, using the historical data to determine an alternative itinerary to the destination based on comparing a first expected travel time for the itinerary, given the current traffic progress, to a second expected travel time for the alternative itinerary; and depending on a result of the comparing, starting to provide the navigation information with respect to the alternative itinerary;

wherein the second expected travel time is calculated based on scaling the historical traffic progress on a further road in the alternative itinerary with a quantity representative of the current traffic progress on the specific road.

* * * * *

UNITED STATES PATENT AND TRADEMARK OFFICE

CERTIFICATE OF CORRECTION

PATENT NO. : 8,332,132 B2
APPLICATION NO. : 12/073792
DATED : December 11, 2012
INVENTOR(S) : Lucien Groenhuijzen et al.

It is certified that error appears in the above-identified patent and that said Letters Patent is hereby corrected as shown below:

On the title page, item (75) Inventors: Rob Schuurbiere, should read --Rob Schuurbiers--.

Signed and Sealed this
Twenty-third Day of April, 2013

Teresa Stanek Rea
*Acting Director of the United States Patent and Trademark Office*